Patented June 12, 1923.

1,458,670

UNITED STATES PATENT OFFICE.

HEINRICH THRON, OF FRANKFORT-ON-THE-MAIN, GERMANY, ASSIGNOR TO THE FIRM OF VEREINIGTE CHININFABRIKEN ZIMMER & CO., G. M. B. H., OF FRANKFORT-ON-THE-MAIN, GERMANY, A CORPORATION OF GERMANY.

MANUFACTURE OF ALKYLIZED DERIVATIVES OF HYDROCUPREINE.

No Drawing. Application filed April 9, 1921. Serial No. 460,025.

(GRANTED UNDER THE PROVISIONS OF THE ACT OF MARCH 3, 1921, 41 STAT. L., 1313.)

*To all whom it may concern:*

Be it known that I, HEINRICH THRON, a German subject, and resident of Frankfort-on-the-Main, Germany, have invented certain new and useful Improvements in the Manufacture of Alkylized Derivatives of Hydrocupreine (for which I have filed applications in Germany, September 11, 1916, Patent 344,140; Austria, February 22, 1921; Holland, February 22, 1921; Switzerland, February 24, 1921; Hungary, March 1, 1921), of which the following is a specification.

The invention relates to the manufacture of alkylized derivates of hydrocupreine which as is well known have become important drugs and have been hitherto manufactured by treating hydrocupreine in the usual manner with alkylizing means.

The new process consists in alkylizing hydrocupreine oxide which can be obtained for instance by oxidizing hydrocupreine and converting the alkylized hydrocupreine oxides obtained, by reduction into the corresponding alkyl-hydrocupreines.

In the well known processes, not only a hydrogen atom of the phenol-hydroxyl group of hydrocupreine is replaced by an alkyl, but alkyl settles on a nitrogen atom of the base, owing to which ammonium bases are produced which affect the yield of alkyl-hydrocupreines. In the new process no ammonium bases are formed as the nitrogen atom on which alkyl otherwise settled is protected by the combination with an oxygen atom. As alkyl-hydrocupreine oxides can be readily reduced to alkyl-hydrocupreines, a better yield of alkyl-hydrocupreine is obtained by this process.

Example 1.

328 parts hydrocupreine oxide (1 molecule) which can be obtained by treating hydrocupreine with hydrogen peroxide (for instance by mixing equal parts of hydrocupreine, alcohol and a 30% solution of hydrogen peroxide and allowing said mixture to stand at a temperature not exceeding 40°, until the substance are in solution; water being then added until the solution is cloudy whereupon hydrocupreine oxide will separate in flaky crystals of F. 199°), are dissolved in 1600 parts alcohol with an addition of 40 parts hydrate of soda (1 molecule) and mixed with 154 parts ethyl sulphate (1 molecule). After standing for two days at the temperature of the room (when heating, a shorter time will be sufficient), it is rendered Congo-acid with sulphuric acid, whereupon ammonia is added so that methyl-orange is just modified. When left to stand, sulphate of ethyl-hydrocupreine oxide is separated, and drawn off and washed with alcohol and water. Colourless needles are formed with a strongly bitter taste which are soluble, with difficulty in alcohol and water. For the purpose of converting the ethyl-hydrocupreine oxide sulphate into ethyl-hydrocupreine, it is heated in an autoclave with an excess of sulphurous acid for three hours to 80°. After cooling, it is shaken with an excess of soda lye and ether. On distilling off the ether solution washed with water, ethyl-hydrocupreine is obtained and purified by converting it into neutral sulphate.

The process could be also carried out not by separating the ethyl-hydrocupreine-oxide sulphate but by heating for several hours to 80° the product of reaction rendered Congo-acid with sulphuric acid, with an excess of sulphurous acid, by distilling off the alcohol and after cooling shaking with an excess of soda lye and ether. In distilling off the ether solution washed with water, there will remain ethyl hydrocupreine which is purified by conversion into neutral sulphate.

Example 2.

4 parts hydrocupreine oxide, 20 parts alcohol, 1 part caustic potash and 2 parts ethylene chloride are heated in an autoclave for 20 hours to 105°. Thereupon 6 parts of sodium sulphite are added, the whole is rendered Congo-acid with sulphuric acid and heated in an autoclave for a further three hours to 80°. After distilling off the alcohol and cooling, excess of soda lye is added, and extraction with ether is effected. After the ether solution is concentrated, chlor-ethyl-hydrocupreine will separate in fine colourless needles; it is easily soluble in alcohol, chloroform and dilute acids, soluble with more difficulty in ether, insoluble in benzene and water; the melting point is at 164°.

The manufacture of other alkyl-hydrocupreines is effected in a similar manner.

I claim:

1. A process for the manufacture of alkyl derivatives of hydrocupreine, characterized by hydrocupreine oxide, being alkylized by the usual alkylizing means, the alkylized products being converted by reducing means into alkyl-derivatives of hydrocupreine.

2. A process for the manufacture of alkyl-derivatives of hydrocupreine characterized by hydrocupreine-oxide, being treated by substituted alkyl-radicals, the alkylized products being converted by reducing means into substituted alkyl-derivatives of hydrocupreine.

3. A process for the manufacture of alkyl derivatives of hydrocupreine characterized by hydrocupreine oxide, being alkylized by the usual methods, the alkylized products being converted by sulphurous acid into alkyl derivatives of hydrocupreine.

4. A process for the manufacture of ethyl-derivatives of hydrocupreine characterized by hydrocupreine-oxide being treated by substituted ethyl-radicals, the ethylized products being converted by reducing means into substituted ethyl-derivatives of hydrocupreine.

5. A process for the manufacture of ethyl-derivatives of hydrocupreine characterized by hydrocupreine-oxide being treated by the usual ethylizing means, the ethylized products being converted by reducing means into ethyl-derivatives of hydrocupreine.

In testimony whereof I have signed my name to this specification in the presence of two subscribing witnesses.

HEINRICH THRON.

Witnesses:
AUGUST BECKER,
HANS KRAUS.